(No Model.)  5 Sheets—Sheet 2.
G. CUNIN.
MACHINE FOR MAKING CRIMPED STOVEPIPE ELBOWS.
No. 541,472.  Patented June 25, 1895.
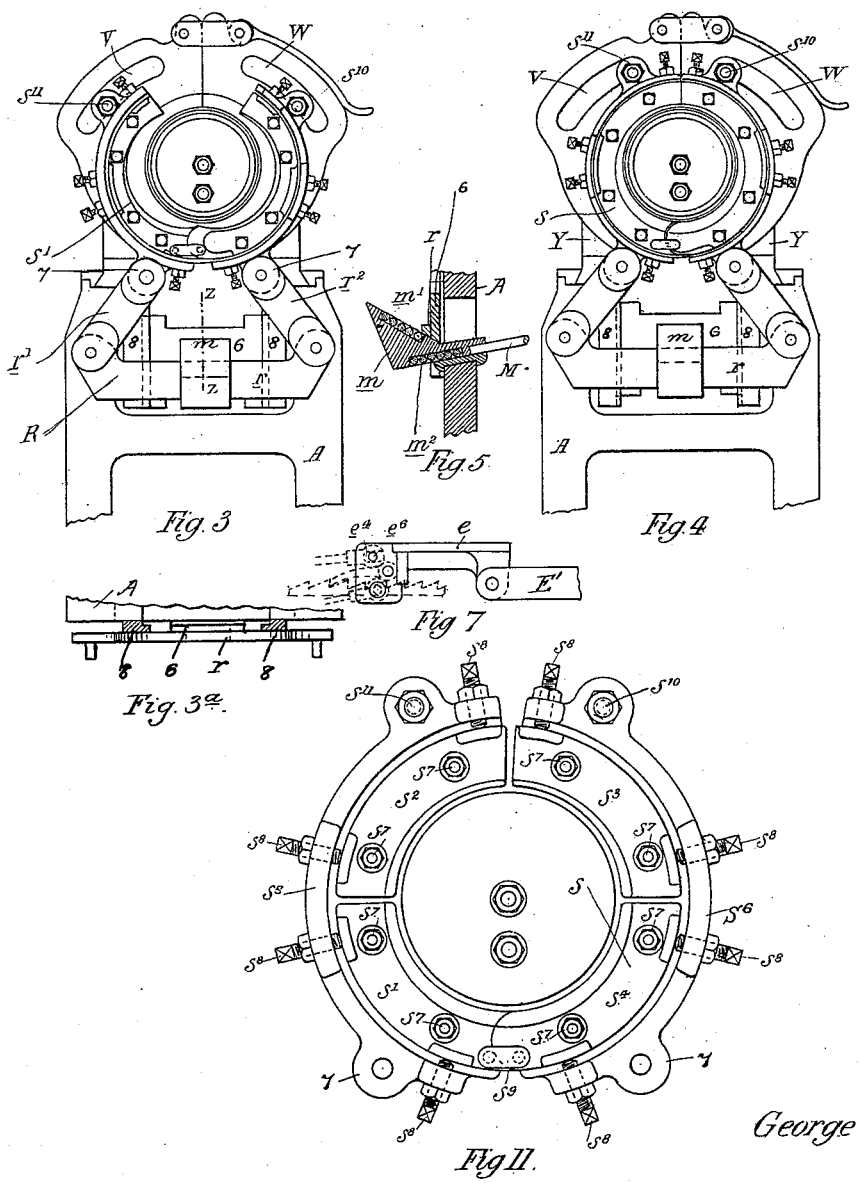

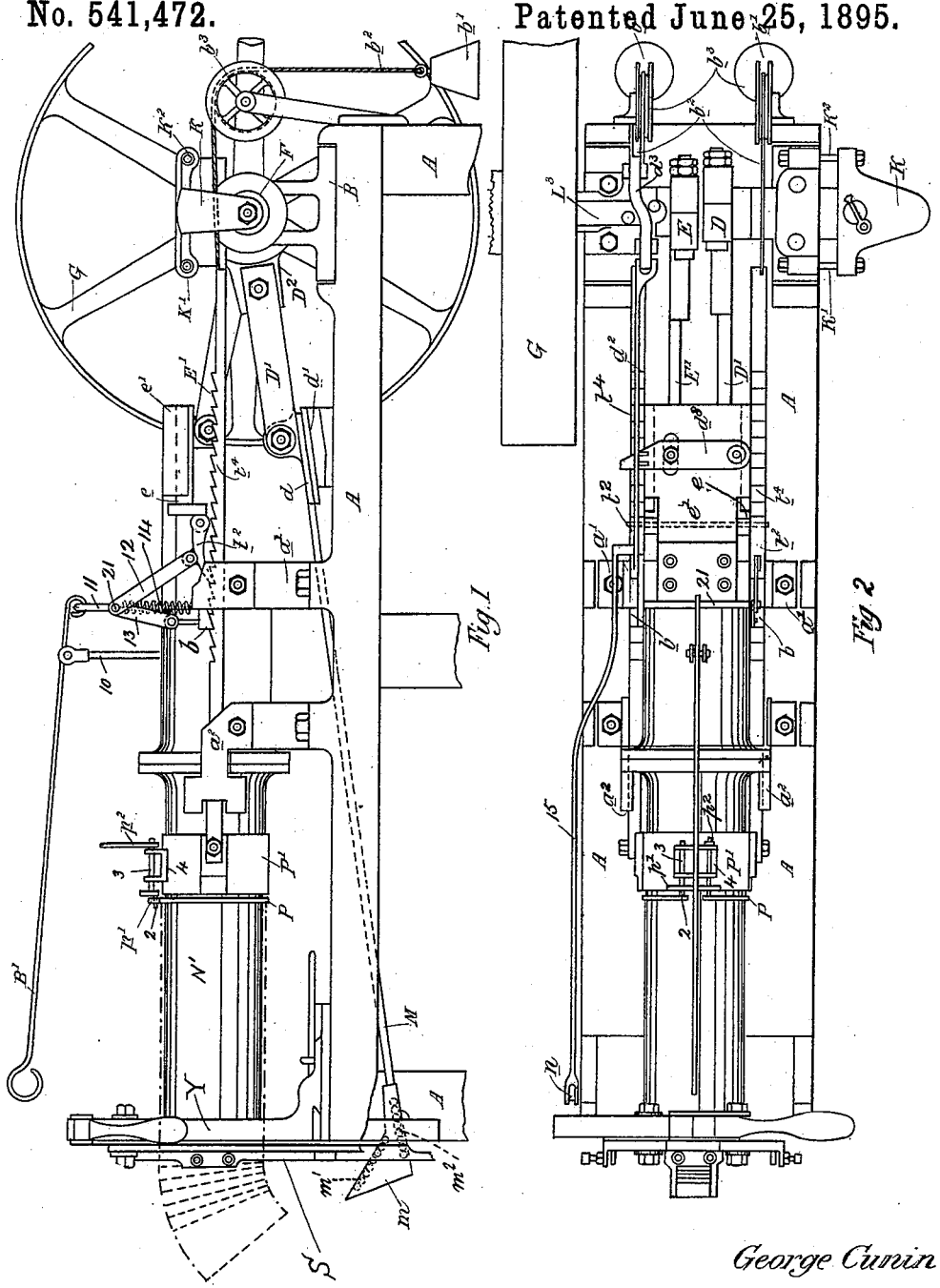

(No Model.) 5 Sheets—Sheet 3.
G. CUNIN.
MACHINE FOR MAKING CRIMPED STOVEPIPE ELBOWS.
No. 541,472. Patented June 25, 1895.
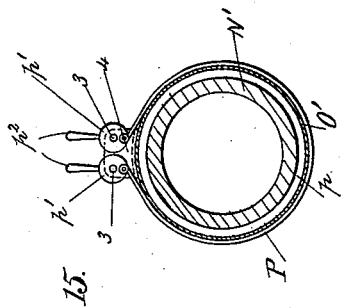
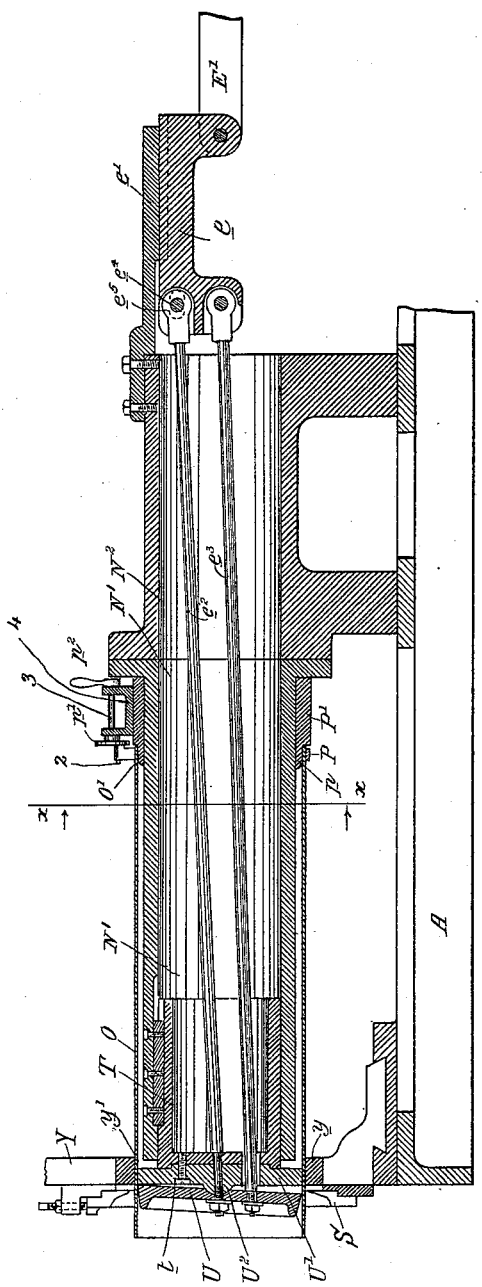
Witnesses
James Laurin.
Alph. Walter.
George Cunin
Inventor
by J. Cunin Davies
Attorney.

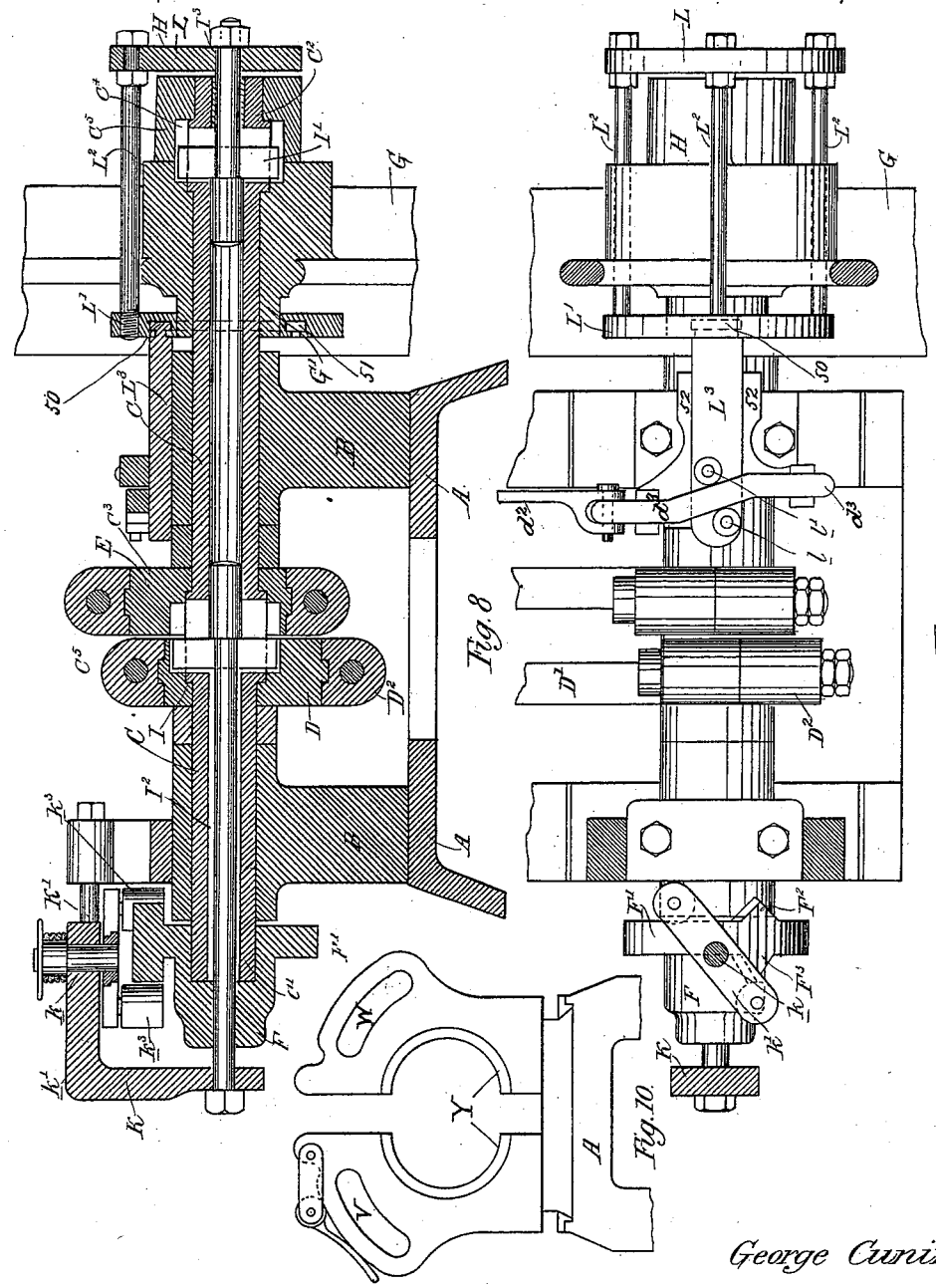

(No Model.) 5 Sheets—Sheet 5.

G. CUNIN.
MACHINE FOR MAKING CRIMPED STOVEPIPE ELBOWS.

No. 541,472. Patented June 25, 1895.

George Cunin
Inventor

Witnesses
James Laurin
Alph. Walter

Attorney.

UNITED STATES PATENT OFFICE.

GEORGE CUNIN, OF MONTREAL, CANADA.

MACHINE FOR MAKING CRIMPED STOVEPIPE-ELBOWS.

SPECIFICATION forming part of Letters Patent No. 541,472, dated June 25, 1895.

Application filed September 4, 1894. Serial No. 522,065. (No model.)

*To all whom it may concern:*

Be it known that I, GEORGE CUNIN, a citizen of the Dominion of Canada, residing in the city and district of Montreal and Province of Quebec, Canada, have invented certain new and useful Improvements in Machines for Making Crimped Stovepipe-Elbows; and I do hereby declare the following to be a full, clear, and exact description of the invention, such as will enable others skilled in the art to which it appertains to make and use the same.

This invention relates to machines for making pipe elbows; and it consists in the novel construction and combination of the parts hereinafter fully described and claimed.

Figure 12:
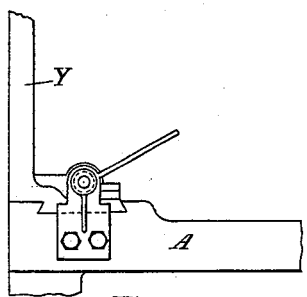
Figure 13:
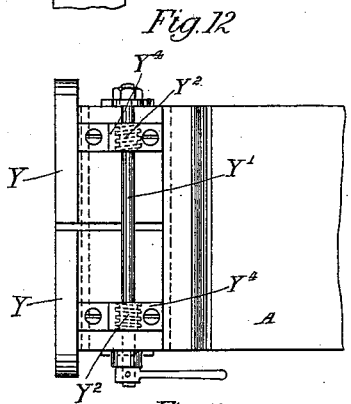
Figure 14:
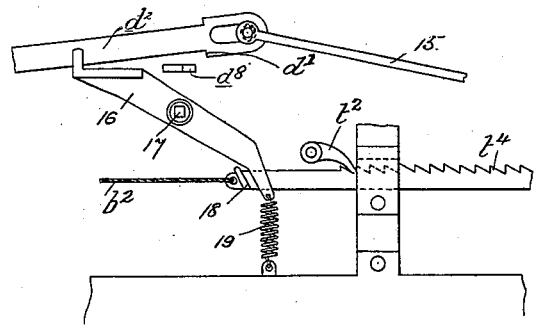

In the drawings, Figure 1 is a side view of the machine. Fig. 2 is a plan view of the same. Fig. 3 is a front end view showing the yoke open. Fig. 3$^a$ is a plan view of the end piece $r$ and the slide 6, showing the guides 8 in section; and Fig. 4 is a similar view showing the yoke closed. Fig. 5 is a longitudinal section taken on the line Z Z in Fig. 3. Fig. 6 is a longitudinal section through the mandrel and mandrel-holder. Fig. 7 is a detail view showing the connection of the connecting-rod E' to the cross-head $e$. Fig. 8 is a longitudinal section through the main driving-shaft and its co-operating parts, and Fig. 9 is a plan view of the same. Fig. 10 is a detail front view of the yoke Y. Fig. 11 is a detail front view of the parts carried by the yoke. Fig. 12 is a side view showing the attachment of the yoke to the frame A. Fig. 13 is a plan view of the same. Fig. 14 is a side view of the trip mechanism for stopping the machine. Fig. 15 is a cross-section through the mandrel, taken on the line $x\,x$ in Fig. 6.

A is the frame of the machine provided at its rear end with bearings B in which the hollow main driving shaft C is journaled.

G is the driving pulley which is loose on the shaft C. The end $C^2$ of the shaft C is provided with an enlargement $C^4$ having a slot $C^5$ formed through it. (See Fig. 8.)

I$^3$ is a rod which slides in the hollow shaft C and carries a cotter I' which slides in the slot $C^5$.

H is a disk secured on the end $C^2$ of the shaft C. When in the position shown in Fig. 8, the cotter I' engages with notches in the hub of the driving pulley G and operatively connects it to the shaft C, but when moved to the left the cotter slips out of the said notches and disengages the driving pulley.

L is a plate secured on the end of the rod I$^3$.

L' is a plate which slides on the boss G' of the hub of the pulley G. L$^2$ are rods connecting the plates L and L' together.

L$^3$ is a bar projecting from the plate L' and provided with rollers $l\,l'$ as shown in Fig. 9. The bar L$^3$ is provided with a head 50 which slides in a circular recessed groove 51 in the face of the plate L', and 52 are guides on the top of the adjacent bearing B for the said bar to slide between. This bar affords a means for disengaging the driving pulley and stopping the machine as will be more fully described hereinafter.

The central portion of the shaft C is provided with an enlargement C$^3$ having a slot C$^5$ formed through it.

I$^2$ is a rod which slides in the hollow shaft C and carries a cotter I which slides in the slot C$^5$.

D and E are two eccentrics mounted loosely on the central part of the shaft C and provided with notches for the cotter I to engage with. The rod and the cotter I are moved back and forth to alternately couple the eccentrics D and E to the shaft C.

F is a cam plate secured on the end C' of the shaft C and provided with the two tappets F$^2$ and F$^3$ projecting from its flange F'. A plate K is secured to the end of the rod I$^2$ and slides on the guides K' and K$^2$ (see Fig. 2) which project from the shaft bearing or support A pin $k$ projects downwardly from the plate K and is provided with a cross-piece $k'$. Rollers $k^3$ are journaled on pins projecting from the cross piece $k'$, and are arranged on opposite sides of the flange F' in the paths of the tappets F$^2$ and F$^3$. The tappets strike the rollers $k^3$ as the shaft C revolves, and the rod I$^2$ is reciprocated and caused to couple the eccentrics D and E alternately to the shaft C. The eccentric D is provided with a strap D$^2$, and a rod D' the end of which is pivoted to the cross head $d$. (See Fig. 1.) The cross head $d$ slides in the guide $d'$ carried by the frame A.

M is a rod secured to the cross head $d$ and provided at its front end with the wedge $m$ for working the crimping mechanism. The wedge $m$ slides on the frame A and under the end piece $r$ of the frame R, as shown in Fig. 5, and is provided with rollers $m'$ and $m^2$ for reducing the friction between it and the said parts against which it bears.

$N^2$ is a support or holder for the mandrel, secured to the frame A at about the middle of the machine.

$N'$ is the mandrel (see Fig. 6) secured at one end to the mandrel holder.

O is a sheet-iron tube or cylinder which is to be formed into a pipe-elbow. This cylinder is slid upon the mandrel.

$P'$ is a ring which is free to slide on the mandrel $N'$. The cylinder O is clamped to the ring $P'$ at $O'$ by means of a band P. The band P encircles the cylinder, and its ends (see Fig. 2) are secured to two crank pins 2 projecting from crank plates $p'$. The crank plates $p'$ are secured on the shafts 3 which are journaled in a bracket 4 secured to the ring $P'$. Levers $p^2$ are secured on the ends of the shafts 3, and when the said levers are moved apart, the crank pins are moved toward each other and the band P is caused to clamp the end of the cylinder O.

The eccentric E for moving the tube O longitudinally, is provided with a strap and a rod $E'$ of ordinary approved construction, and the end of the rod $E'$ (see Fig. 6) is pivoted to the cross head $e$ which slides in the guide $e'$ secured to the mandrel support $N^2$. Pawls $t^2$ are pivoted to the sides of the cross head $e$ as shown in Figs. 1, 2 and 7, and effect the longitudinal movement of the tube O as will be more fully described hereinafter.

The crimping device consists of a ring S made in four sections $s'$, $s^2$, $s^3$, and $s^4$, as shown in Fig. 11. These sections are secured to two segments $S^5$ and $S^6$ by the bolts $S^7$ and their position is adjusted by the set screws $S^8$. The segments are pivoted together by the link $S^9$ and their upper parts are provided with guide bolts $S^{10}$ and $S^{11}$.

Y is a yoke formed in two parts as shown in Figs. 10, 12, and 13. This yoke is supported by the frame A behind the crimping device S. The upper parts of the yoke are provided with curved slots V and W for the bolts $S^{10}$ and $S^{11}$ to slide in. The parts of the yoke slide in a dovetailed slot in the frame A and are moved apart when required by means of the revoluble shaft $Y'$ which is provided with right and left hand screw-threads $Y^2$ engaging with nuts $Y^4$ secured to the parts of the yoke. A slide 6 works in the vertical guides 8 secured to the frame A, and the end piece $r$ of the frame R is secured to the slide 6. The frame R consists of the end piece $r$ and the links $r'$ and $r^2$ which are pivotally connected to the end piece $r$ and to the lugs 7 on the segments $S^5$ and $S^6$.

T is a sliding piston splined in the end of the mandrel $N'$, and $U'$ is a disk fitting inside the tube O and provided with a central convex boss $U^2$. A rod $e^2$ is provided with a pin $e^4$ at its rear end (see Fig. 6) which slides in a slot $e^5$ in the cross head $e$. The front end of the rod is secured to the said piston and disk, and the said piston and disk are also secured together by the screw $t$. The front end of the rod $e^2$ also serves to pivot the disk U upon the said convex boss, and a nut is provided on the end of the rod to keep the said disk in place. A rod $e^3$ is pivoted at its rear end to the cross head $e$ and has its front end passed through holes in the end of the piston and the disk $U'$ and secured to the lower part of the disk U below the boss $U^2$.

Pawls $t^2$ (see Figs. 1 and 2) are pivoted to the sides of the cross head $e$ and engage with rachet teeth on the rack bars $t^4$ which are carried by the supports $a'$ $a^2$. The front ends of the rack bars are secured to the ring $P'$, and $b^2$ are cords secured to the rear ends of the rack bars and provided with weights $b'$. Pulleys $b^3$ are provided at the rear end of the machine for the cords $b^2$ to run over.

$B'$ is a handle pivoted to the support 10, and 11 is a link pivoted to the end of the handle and to the middle of a cross bar 21. Links 12 and 13 are pivoted on the ends of the bar 21. The links 12 are pivoted to the pawls $t^2$, and the links 13 are pivoted to the stop pawls $b$ which also engage with the ratchet teeth of the rack bars. The pawls are normally held in gear with the rack bars by the spring 14.

The disengaging bar $L^3$ (see Figs. 9 and 2) is operated by the bent bar $d^3$, which is attached to the rear end of the rod $d^2$, and 15 is a rod attached to the front end of the rod $d^2$ and provided at its front end with a handle $n$ so that the machine can be started and stopped by the operator at the front end of the machine. The front end of the rod $d^2$ rests on a lever 16 which is pivoted on a pin 17 projecting from the frame, and 19 is a spring which normally holds the front end of the rod $d^2$ raised, as shown, so that the shoulder $d'$ of the rod is clear of the tappet $d^8$ which is secured to the guide $e'$, as shown in Fig. 2. A projection 18 on the end of the rack bar $t^4$ turns the lever 16 and lowers the end of the bar $d^2$ before the rack bars arrive at the end of their travel toward the front of the machine. The tappet $d^8$ then pushes back the rod $d^2$ and stops the machine. When the pawls $t^2$ and $b$ are raised, the rack bars are pulled back by the weights $b'$, and the spring actuated lever 16 raises the shoulder $d'$ clear of the tappet $d^8$ so that the machine may be started by hand by means of the rod 15.

The operation of the machine is as follows: The tube O is inserted through the yoke Y over the mandrel and is then clamped by the band P to the ring $P'$. The machine is started by pushing back the rod 15, the shaft C being coupled to the eccentric D as shown in Fig. 8. The eccentric D pulls back the rod M, and the wedge $m$ raises the frame R and the crimping device. The lower part of the tube O is pressed away from the part $y$ of the yoke (see Fig. 6) and its upper part is pressed against the part $y'$ of the yoke. The tube O is indented at the bottom and sides by the ring S, and the indentation is pressed upward between the disks U and U'. The continued motion of the eccentric D lowers the crimping device out of the way, and the cam plate F moves the rod $I^2$ and slides the cotter I so that the eccentric D is disconnected from, and the eccentric E connected to, the revolving shaft C. The eccentric E now pulls back the cross head $e$ and the rod $e^3$. The lower side of the disk U is caused to compress the indentation or crimp formed in the tube O, but the rod $e^2$ and the disk U are not pulled back until the indentation has been compressed because of the slot in which the pin $e^4$ works. When the continued motion of the cross head $e$ pulls back both the rods $e^2$ and $e^3$, the crimp or indentation is smoothed flat upon the inside of the tube O. The continued motion of the eccentric E now pushes forward the cross head $e$. The pawls $t^2$ engage with the rack bars and push forward the ring P' and the tube O. When the rack bars are pushed back for the space of one tooth, the pawls $b$ drop by gravity into the next teeth and prevent the return of the rack bars by bearing against the supports $a'$. The disks U and U' are also pushed forward to the positions shown in Fig. 6 and the machine is then ready for the next upstroke of the crimping device.

What I claim is—

1. In a pipe-elbow machine, the combination, with the driving shaft C, the two eccentrics D and E, and means for connecting the said eccentrics to the said shaft alternately; of a crimping device operatively connected to the eccentric D; and disks, for compressing and smoothing the crimp, operatively connected to the eccentric E, substantially as set forth.

2. In a pipe-elbow machine, the combination, with the driving shaft C provided with a slot $C^5$; of the eccentrics D and E mounted on the said shaft and provided with notches; the rod sliding in a hole in the shaft C and provided with the cotter I for alternately coupling the said eccentrics to the shaft, a cam plate secured on the shaft C, and tappet mechanism secured to the said rod and operated by the said cam, whereby the said rod is reciprocated in the shaft, substantially as set forth.

3. In a pipe-elbow machine, the combination, with the rod M, and driving mechanism for reciprocating it; of the wedge $m$ secured to the said rod, the jointed frame R resting on the said wedge, and the crimping device supported by the said frame and raised and lowered by the said wedge, substantially as set forth.

4. In a pipe-elbow machine, the combination, with the yoke Y formed of two separable parts provided respectively with the curved guide grooves V and W, and the revoluble shaft provided with right and left hand screw threads engaging with the said parts of the yoke and affording a means for opening and closing it; of the crimping device provided with guide bolts sliding in the said grooves; and driving devices operating to raise and lower the said crimping device, substantially as set forth.

5. In a pipe-elbow machine, the combination, with the stationary guides 8, of the slide 6 working in the said guides, the frame R consisting of the cross piece $r$ secured to the said slide and the pivoted links $r'$ $r^2$, the crimping device pivotally connected to the said links, the wedge $m$ arranged under the said cross piece and slide, and means for reciprocating the wedge and thereby raising and lowering the crimping device, substantially as set forth.

6. In a pipe-elbow machine, the combination, with the mandrel N', of the piston T sliding therein, the disk U' secured to the said piston, the disk U pivoted to the disk U', the reciprocatory cross head $e$ provided with the slot $e^5$, the rod $e^2$ provided with a pin $e^4$ sliding in the said slot, the front end of the said rod being connected to the said disks and piston; and the rod $e^3$ pivoted to the said cross head and connected to the disk U, substantially as and for the purpose set forth.

7. In a pipe-elbow machine, the combination, with the mandrel N', and the ring P' sliding thereon and provided with clamping devices for the tube to be crimped; of the reciprocatory cross head $e$, the rack bars provided with ratchet teeth and secured to the said ring, the pawls pivoted to the cross head and engaging with the rack bars, and stop pawls for preventing the reverse motion of the rack bars, substantially as set forth.

8. In a pipe-elbow machine, the combination, with the mandrel N', and the ring P' sliding thereon and provided with clamping devices; of the toothed rack bars, and the weights attached to them and operating to pull the said ring rearwardly along the mandrel; the reciprocatory cross head $e$, and the pawls pivoted to it and engaging with the rack bars; the stop pawls $b$; and pivoted link mechanism operating to raise the said pawls simultaneously, thereby permitting the said ring to slide back, substantially as set forth.

9. In a pipe-elbow machine, the combination, with the reciprocatory cross head $e$ provided with pawls $t^2$ and a tappet $d^3$, the rack bars engaging with the said pawls, the mandrel; and the ring sliding on the mandrel, secured to the rack bars, and provided with clamping devices; of disengaging mechanism for stopping the machine, provided with an operating rod having a shoulder $d'$; the spring-actuated lever 16 normally supporting the end of the said rod, and a projection on one side of one of the rack bars for operating the said lever and lowering the end of the said rod, thereby permitting the tappet to strike the said shoulder and operate the said disengaging mechanism, substantially as set forth.

10. In a pipe-elbow machine, the combination, with a stationary mandrel, and a ring sliding thereon and provided with clamping devices for the tube to be crimped; of a yoke for supporting the tube at the free end of the mandrel; a vertically sliding crimping device arranged in front of the said yoke; the compressing and smoothing disks arranged inside the tube at the free end of the mandrel; reciprocatory driving mechanism and intermediate connections operating to advance the said ring and tube step by step and to reciprocate the said disks; reciprocatory driving mechanism for operating the crimping device when the said disks are pushed forward; and a driving shaft provided with automatic coupling devices connecting it with the two said driving mechanisms alternately, substantially as and for the purpose set forth.

In testimony whereof I affix my signature in presence of two witnesses.

GEORGE CUNIN.

Witnesses:
JAMES LARVIM,
H. DURIER.